United States Patent [19]

Miller et al.

[11] 4,375,914

[45] Mar. 8, 1983

[54] BATTERY POWERED CAMERA

[75] Inventors: Gary E. Miller, Tokyo; Iwao Hasegawa, Setagaya, both of Japan

[73] Assignee: Osawa Precision Industries, Ltd., Japan

[21] Appl. No.: 298,000

[22] Filed: Aug. 31, 1981

[30] Foreign Application Priority Data

Sep. 3, 1980 [JP] Japan .............................. 55-124481[U]
Sep. 5, 1980 [JP] Japan .............................. 55-125585[U]

[51] Int. Cl.³ ...................... G03B 17/18; G03B 17/00
[52] U.S. Cl. ..................................... 354/82; 352/243; 354/289
[58] Field of Search ................ 352/95, 243; 354/60 E, 354/60 L, 81, 82, 289

[56] References Cited

U.S. PATENT DOCUMENTS 3,519,341 7/1970 Dudley .............................. 354/82 X
3,602,586 8/1971 Bartl et al. ........................ 354/82 X

*Primary Examiner*—Michael L. Gellner
*Attorney, Agent, or Firm*—Robert E. Wagner; Ralph R. Rath

[57] ABSTRACT

A battery powered camera with a collapsible handgrip movable between a closed and an extended position is equipped with a battery checker that signals when the battery drops in capacity to a predetermined level. The battery checker is operable only during the period in which the handgrip is moved between the closed and extended position or vice versa. The battery powered camera further comprises means for signalling a switching state in which the main power switch remains closed. The signalling means is also operable only when the handgrip is being moved between closed and extended positions.

7 Claims, 7 Drawing Figures

BATTERY POWERED CAMERA

BACKGROUND OF THE INVENTION

The present invention relates to a battery powered camera, and more particularly to a camera such as a motion picture camera with a collapsible grip adapted for use to check the residual capacity of the battery and to prevent the wasteful consumption thereof.

Recently, many cameras include electronic control circuits and film driving systems which are powered by a replaceable battery in the camera. In a small camera, the battery incorporated in the camera becomes accordingly small in size and has only limited capacity. To promote the effective use of such a small capacity battery, the wasteful consumption of the battery must be avoided and a check must regularly be made to examined how long the battery can still be used.

For this purpose, a camera with a battery therein is usually equipped with a battery checker which serves to check the residual capacity of the battery and signal the user that the battery is exhausted beyond a certain level. The battery checker of the conventional type is operated by a push button provided on the side of the camera body and emits light or sound if the capacity of the battery is adequate for operation. Alternatively, the battery checker is constructed in the form of an indication meter that indicates the residual capacity of the battery.

A battery checker with such a construction, however, has the drawback of needing many parts and has a complicated circuit arrangement with increasingly high manufacturing costs.

To prevent the wasteful consumption of the battery, the battery powered camera is further equipped with a device for turning a main power switch off automatically after camera operation is finished. This device allows the automatic turning-off of the main power switch only when it is set in a functional position before camera operation begins. It, however, leads to unnecessary consumption of the battery if the user forgets to set the device in the functional position prior to operation.

Therefore, an object of the present invention is to overcome these above-mentioned drawbacks and provide a battery powered camera capable of indicating the residual capacity of the battery and signalling the user with ease that the battery is exhausted to a predetermined level.

Another object of the present invention is to provide a battery powered camera capable of preventing the wasteful consumption of the battery after the camera operation has been completed.

SUMMARY OF THE INVENTION

According to one aspect of the present invention, a battery powered camera is provided which includes a collapsible handgrip movable between closed and extended positions and a battery checker which checks the level of a battery and signals when the battery drops in capacity to a predetermined level. The battery checker is operable only when the handgrip is being moved between the closed and extended positions.

According to another aspect of the present invention, a battery powered camera with a collapsible handgrip includes means for signalling a switching state in which the main power switch remains closed. The signalling means is operable only during the time in which the handgrip is moved between closed and extended positions. The signalling device can advantageously be combined with the battery checker for signalling the user that the battery has dropped in capacity and/or the main power switch remains closed after camera operation has been finished. In this case, the battery checker is operable independently of the switching state of the main power switch, and the signalling device depending on whether the main power switch is closed or open.

BRIEF DESCRIPTION OF THE DRAWINGS

Further features and advantages of the invention will become apparent from the following detailed description where reference is made to the accompanying drawings:

FIG. 6 is a diagram showing the circuit which prevents the main power switch from remaining turned on.

DETAILED DESCRIPTION OF THE PREFERRED EMBODIMENTS

Figure 1:
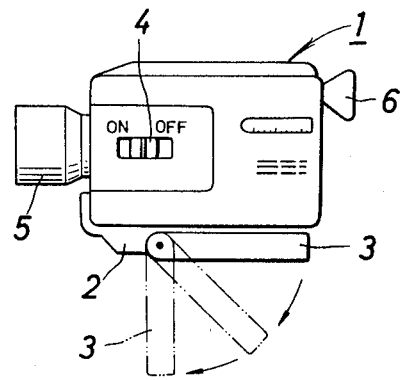
FIG. 1 is a schematic side-view showing a battery powered camera with a collapsible handgrip according to one embodiment of the present invention.

FIG. 1 is a schematic side view showing a camera such as a motion picture camera which includes a camera body 1 which is equipped with a handgrip 3 pivotally mounted on a mounting frame 2 on the bottom of the camera body 1. The grip 3 is collapsible and can be moved from a closed position, as shown in FIG. 1 by a solid line, to an extended functional position as shown by dot and dash lines. The camera body 1 is further provided on the front with a photographic lens 5 and on the back with an eye piece 6. The camera can be operated for film driving by means of a main power switch 4 on the side of the camera body 1.

Figure 2:
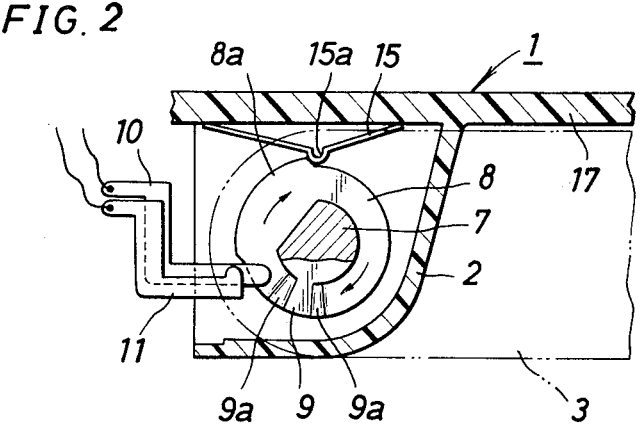
FIG. 2 is a cross-section showing the interior construction of the collapsible handgrip of FIG. 1.
Figure 3:
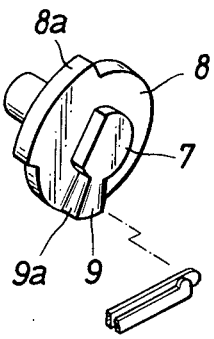
FIG. 3 is a perspective view showing the cam surface mounted in the handgrip.

The handgrip 3, as shown in FIGS. 2 and 3, is pivotally mounted on the mounting frame 2 on a shaft 7 which is fixedly mounted on one end thereof. The shaft 7 is provided with a cam 8 which includes on one surface a projection 9 having a flat surface at its center and inclined surfaces 9a on each side.

On the side of the camera body 1 there are provided two contact plates 10, 11 (see FIG. 2) which are fixed on the projection side of the camera with one of them coming into contact with the projection 9 as the cam 8 is turned.

A leaf spring 15 is further provided above the cam 8 on the side of the camera body 1 and is bent downward at the center 15a. The bend 15a is positioned so as to come into contact with both ends of a raised section 8a on the cam 8 in response to the turning movement of the cam 8 as the grip is closed or extended. This engagement of the leaf spring 15 with both ends of the raised section 8a forms a detent mechanism in which the grip 3 can be held in the closed or extended position.

Figure 4:
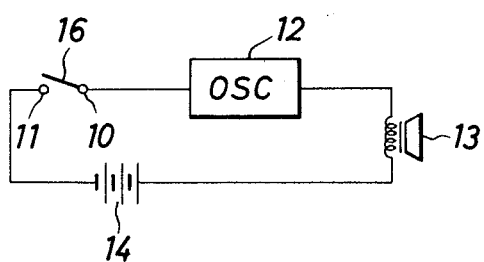
FIG. 4 is an electrical circuit diagram of the battery checker operated in response to the extension or closing of the collapsible handgrip.

FIG. 4 shows the battery checker circuit including an oscillator 12 connected in series with a buzzer or speaker 13 and a battery 14 positioned in the camera body 1. This circuit can be turned on or off by a switch 16 formed by the contact plates 10, 11.

With such an arrangement, the handgrip 3 remains folded near the bottom 17 of the camera body 1 as shown in FIG. 2 by a dot and dash line when the camera is not ready for operation. In this situation, the handgrip 3 is locked into position by the leaf spring 15 whose bend 15a comes into contact with one edge of the raised section 8a on the cam circumference.

In operation, the handgrip 3 is turned clockwise in FIG. 2 for extension with the cam 8 also turned with the result that the projection 9 comes into contact with the contact plate 10 and raises it. This causes the contact plates 10, 11 to be closed and activates the oscillator 12, thereby ringing the buzzer 13 and signalling the user that the battery 14 has enough residual capacity for operation.

The buzzer 13 rings only during the short period of time in which the handgrip 3 is being turned to the closed or extended position and the projection 9 touches the contact plate 10. Thus, the ringing of the buzzer 3 causes no unpleasantness for the user.

A light emission signal can also be used instead of the buzzer. It is, of course, also possible to signal using a combination of light and sound. It is further to be noted that the buzzer 13 doesn't operated when the grip 3 is in extended position because in this position there is no contact between the projection 9 and the contact plate 10, but it again operates as the grip 3 is moved from the extended to closed position.

Thus, in this embodiment of the present invention, the battery checking is automatically made before and after use without any specially designed meter or device. For example, the user is aware that the battery has dropped in capacity to a predetermined level of voltage when no signalling occurs during the raising or lowering of the handgrip. In this case, the user can replace the battery before he operates the camera.

Figure 5:
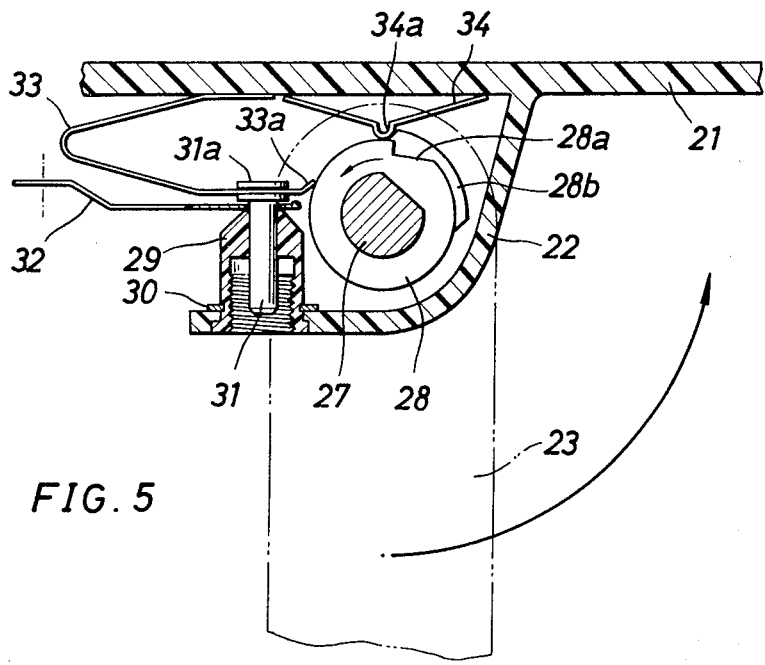
FIG. 5 is a cross-section showing the interior construction of the handgrip according to another embodiment of the present invention.

FIG. 5 shows another embodiment of the battery powered camera according to the present invention which includes a collapsible handgrip 23 mounted on a mount frame 22 so as to be pivotal about a shaft 27 between an extended operative position as shown by the dot and dash line and an inoperative position in which the handgrip 23 is folded near the bottom of the camera body 21. The shaft 27 is formed with a cam 28 having a notch 28a on its outer circumference.

The mounting frame 22 is integrated into the camera body 21 and has at its lower end a cylindrical tripod screw housing 29 which is fixed to the mounting frame 22 by a C-shaped ring 30 and into which a tripod (not shown) can be inserted.

The tripod screw housing 29 is formed with a hollow into which a core 31 can be slid. The head of the core 31a extends beyond the tripod screw housing 29 and is connected to one end of a V-shaped contact spring 33. The other end of the contact spring 33 comes into contact with the bottom of the camera body 21 just above the head 31a of the core 31, thereby providing the core 31 with a downward resilient force.

Figure 6:
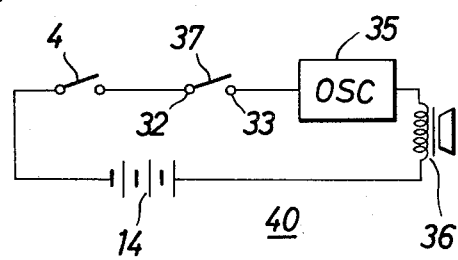

The contact plate 32 is connected at one end to the tripod screw housing 29 in such a manner that the slide movement of the core 31 is not impeded, and at the other end to the battery 14 by means of a main power switch 4 as shown in FIG. 6.

The contact spring 33 extends at one end 33a towards the cam 28 and makes contact with the surface thereof. The point of contact lies above an imaginary horizontal line drawn through the core of the cam 28 and the end portion 33a of contact spring 33 is, thereof, positioned away from contact plate 32 without any contact therewith unless engaged in the notch 28a of the cam 28.

The contact spring 33 is connected to a signalling buzzer or speaker 36 as shown in FIG. 6. The buzzer 36 is activated by the battery 14 when the main power switch 4 and the switch 37 made of the contact plate 32 and contact spring 33 are closed.

The leaf spring 34 is mounted on the bottom of the camera body 21 above the cam 28 and is bent at its center 34a. The bend 34a of the leaf spring 34 comes into contact with one end of the arcuated projection 28b on the cam 28 to hold the grip 23 locked in the operational position when the handgrip 23 is extended as shown in FIG. 5, while coming into contact with the other end thereof to hold the handgrip 23 in an inoperative position when it is folded.

In such an arrangement, the extension of the handgrip 23 causes the cam 28 to be rotated clockwise to raise the core 31 and contact spring 33, thus moving the end portion 33a away from the contact plate 32 and turning switch 37 off. Therefore the buzzer 36 is not sounded and the user is permitted to operate the camera because no closing circuit is established even if the main power switch 4 is closed.

After camera operation is completed, the handgrip 23 is folded and the cam 28 is turned counterclockwise as shown by an arrow in FIG. 5. This causes the end portion 33a of contact spring 33 to fit into notch 28a of the cam 28, so that the core 31 goes down due to the elasticity of the contact spring 33 with the result that the contact plate 32 and contact spring 33 come into contact with each other and keep the switch 37 turned on. If, therefore, the switch 37 remains turned on after the handgrip 23 is folded, the buzzer 36 buzzes to signal that the main power switch 4 remains closed. The turning-off of the main power switch 4 causes no current in the circuit of FIG. 6 and the signalling ceases.

The signalling can also be done by light emission instead of a buzzer.

In addition, a tripod (not shown) can be used and threaded into the tripod screw housing 29 to raise the core 31 and keep the contact plate 32 separated from the contact spring 33 independently of the position of the handgrip 23. This prevents activation of the oscillator 35 and thus signalling. In this case, the signalling naturally occurs if the tripod is removed from the camera body 21 with the handgrip 23 folded and the main power switch 4 turned on.

Figure 7:
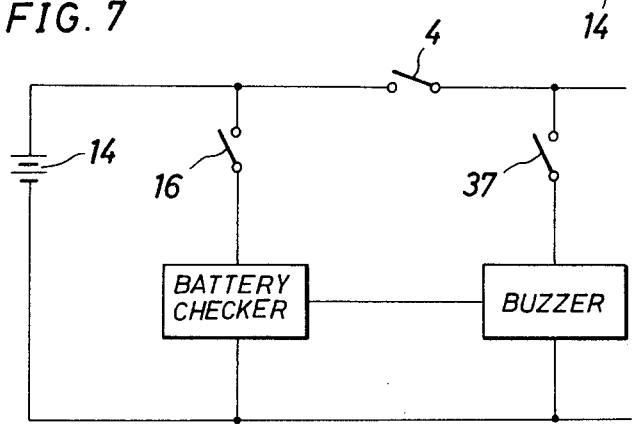
FIG. 7 is a circuit diagram showing another embodiment of the battery checker in combination with the circuit of FIG. 6.

The battery checker circuit in FIG. 4 and the signalling circuit in FIG. 6 are advantageously combined with each other as shown in FIG. 7, in which the battery checking switch 16 and the signalling switch 37 are connected in parallel with the battery 14. It will be understood that battery checking is performed independently of main power switch 4 and signalling switch 37 depending on whether the main power switch 4 is closed or open.

As mentioned above, a battery powered camera used in connection with the present invention makes it possible to check the capacity of the battery automatically in response to the folding or extending action of the handgrip. The battery powered camera of the present invention further allows automatic signalling in response to the folding operation of the handgrip when the main power switch remains closed after camera operation has been completed. Thus, the checking or signalling mechanism in response to the folding or extending of the grip needs no special devices and can prevent the wasteful consumption of the battery, thus resulting in the realization of a low cost camera.

While the invention has been described with reference to a preferred embodiment, it will be understood by those skilled in the art that various changes may be made and equivalents may be sutstituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include all embodiments falling within the scope of the appended claims.

What is claimed is:

1. A battery powered camera having a battery therein for camera operation comprising a camera body in which said battery is replaceably installed, a collapsible handgrip pivotally mounted on said camera body and movable between an inoperative position in which said handgrip is folded and an operational position in which said handgrip is extended from said camera body to operate said camera, a main power switch for turning said battery on for camera operation, and a battery checker for checking battery capacity and signalling when said battery drops in capacity to a predetermined level, said battery checker being operable only during a short period of time in which said handgrip is being moved to said closed or extended position.

2. A battery powered camera according to claim 1, further comprising means for signalling a switching state in which said main power switch remains closed, said signalling means being operable only during a short period of time in which said handgrip is being moved to said folded or extended position.

3. A battery powered camera according to claim 1 or 2, wherein said battery checker operates independently of the switching state of said main power switch.

4. A battery powered camera having a battery therein for camera operation comprising a camera body in which said battery is replaceably installed, a collapsible handgrip pivotally mounted on said camera body and movable between an inoperative position in which said handgrip is folded and an operational position in which said handgrip is extended from said camera body to operate said camera, a main power switch for switching said battery on for camera operation, and means for signalling a switching state in which said main power switch remains closed, said signalling taking place only during a short period of time in which said handgrip is being moved to said closed or extended position.

5. A battery powered camera according to claim 4, further comprising a tripod screw housing for receiving a tripod, said signalling means being inoperative when said tripod is inserted into said tripod screw housing.

6. A battery powered camera according to claim 4, further comprising a battery checker for checking the level of said battery capacity that signals when the capacity of said battery drops to a predetermined level, said battery checker being operable only during a short period of time when said handgrip is being moved to said closed or extended position.

7. A battery powered camera according to claim 6, wherein said battery checker operates independently of the switching state of said main power switch.

* * * * *